Dec. 10, 1929.         C. W. WHITE         1,738,858
CHILD'S VEHICLE
Filed May 18, 1928
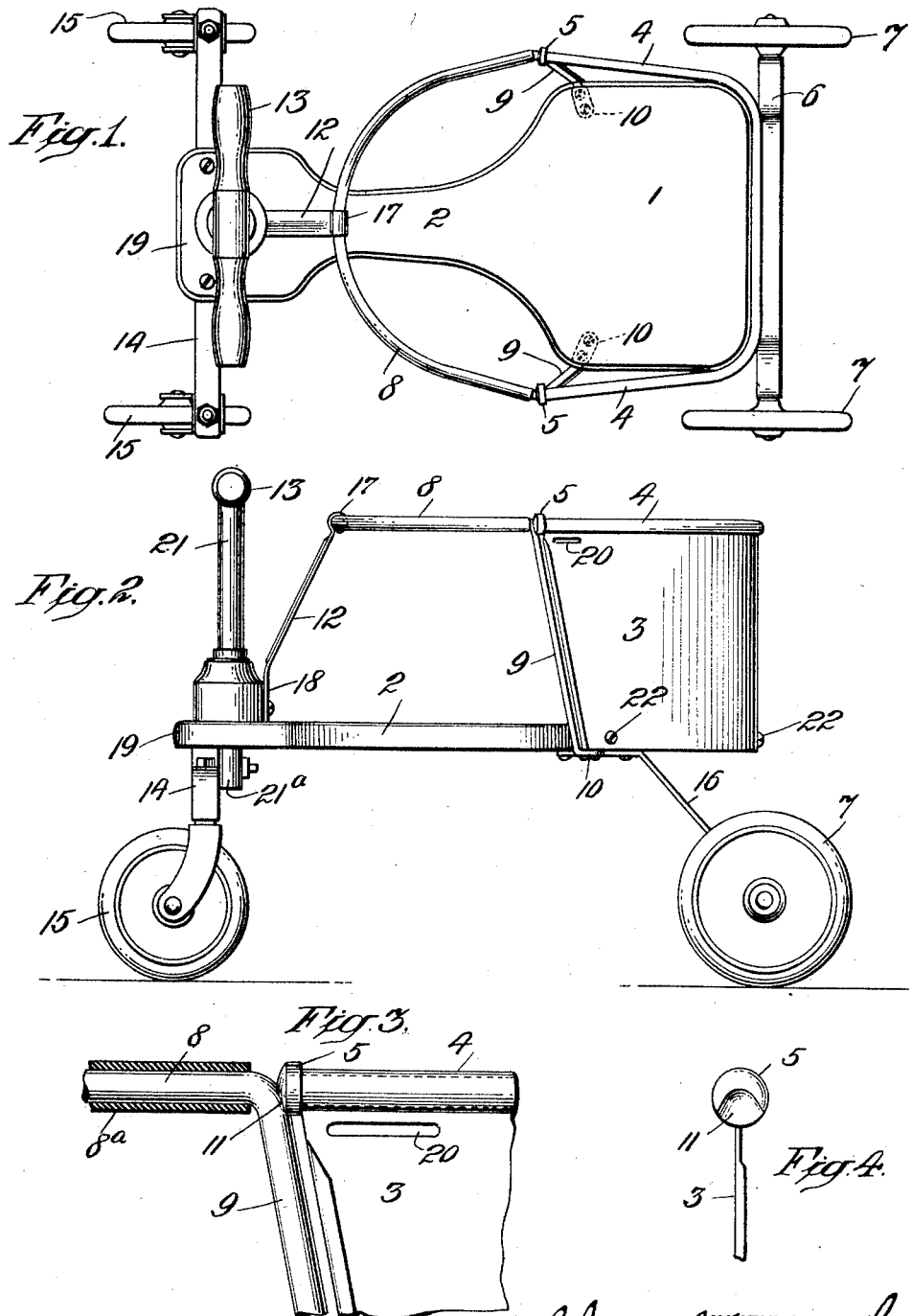

Patented Dec. 10, 1929

1,738,858

UNITED STATES PATENT OFFICE

CLARENCE WATSON WHITE, OF NORTH BENNINGTON, VERMONT

CHILD'S VEHICLE

Application filed May 18, 1928. Serial No. 278,856.

My present invention refers to juvenile vehicles of the kind commonly designated as baby walkers, also used at times as strollers and coasters, though it has a much wider application than this particular class, and may be applied quite generally in the construction of many kinds of vehicles adapted to be used by babies and young children.

The invention relates more particularly to novel and ingenious means for building and mounting a child-confining rod or guard on the body of the vehicle; especially in case of a body having a flat horizontal seat board, the rear portion of which is a seat portion proper and is broad and comfortable, while in front of the seat proper is a narrower part in longitudinal extension thereof, which the child straddles and is supported by when he is propelling the vehicle by the movement of his feet over the surface on which the vehicle rolls; the said rear seat proper having a curved member supported thereon to form a back and sides for the seat, the front being open, and said back and sides member curving around so as to partially and comfortably enclose the body of the child. In connection with this upright back, and side member, it is important to employ a rod or guard which is supported to lie in a semicircular form in front of said member above the narrower front portion of the horizontal seat board, and directly in front of the child when the child is using the vehicle as a baby walker, as also at other times.

The invention may therefore be said to consist essentially in the baby confining rail in combination with a seat and its back when such rail is arranged, constructed, shaped, bent, mounted and upheld in the special manner set forth, and also in numerous details and peculiarities in the construction, combination and arrangement of parts, substantially as will be hereinafter described and claimed.

In the annexed drawing illustrating my invention,

Figure 1 is a top plan view of a child's vehicle equipped with my improved child-confining rail.

Figure 2 is a side elevation of the same.

Figure 3 is an enlarged detail side view of a part of the rail and the upper locking means therefor.

Figure 4 is an edge detail view of said locking or retaining means to prevent lateral displacement of the confining rod.

Similar characters of reference designate corresponding parts throughout all the different figures of the drawing.

As I have above suggested, the improved confining or guard means is adapted chiefly to a certain type of juvenile vehicle. This type by way of example I have portrayed in the drawing so as to more clearly explain the value and characteristics of my novel device.

Such a vehicle has a flat horizontal body or seat board, with a rear broad seat proper 1 and a narrower forward portion 2, extending in front of seat 1 in longitudinal continuation thereof, said part 2 being adapted to be straddled by the child. The front end of part 2 is preferably slightly widened at 19, where the steering column 21 is supported, carrying steering handle 13. Rear wheels 7 for the seat board are rotatably hung on rear bolster 6 which is connected to the board or body through the springs 16 fastened to the body and bolster. Front wheels, either castor-like or fixed, as wheels 15 are arranged with a swivel on the ends of front bolster 14. The post 21 passes down through a hole in the part 19 of the body, and the lower projecting end 21ª is bolted to the bolster 14; but if bolster 14 and its pair of front wheels are removed, a single rolling device or wheel can be substituted and attached to steering post member 21ª so as to be controlled or steered by the handle 13. The details of these steering devices, and the rolling mechanism for the front end of the vehicle, of this substitutional character, so as to be single or double, need not be further described here, as the same does not form a part of the present invention, and is offered here only by way of general explanation of the vehicle.

My present improvements relate to the confining or guard rail the upper part 8 of which lies in a horizontal position above the narrow straddled part 2 of the seat board; and said part 8 is of semicircular form so far as it lies in a horizontal position; but the rear ends of the horizontal rail 8 merge into the vertically inclined brace rail portions 9, 9, which dip downwardly to the seat 1, to which they are rigidly secured in any convenient way, as for example, by bending the lower ends of rail sections 9 around the edge of seat 1 and causing them to lie horizontally under seat 1 and against same, to which they are firmly fastened by screws or other means. Thus the baby confining member is mounted firmly in position on the seat board, with guard portion proper 8 in a horizontal plane, and extending forwardly towards the steering devices, so that the child may be amply protected and efficiently enclosed thereby when it is astride the narrow section 2 and walking on the ground. The extreme forward part of the horizontal rail section 8 is assisted in being upheld by the inclined brace 12, whose lower end 18 is screwed or secured to the steering post near the seat board or to the seat board or otherwise, while the upper end is looped or bent at 17 around rail 8 to enclose and engage said rail 8.

On the seat 1, at the rear of the vehicle, I erect a back and side member 3 which is adapted to curve around and partly enclose the body of the child, leaving the front open, but giving a comfortable support to the back and sides of the child. This may be made of any suitable material, as thin metal for example, and is preferably secured at its lower edge to the edge of seat 1 by screws 22. The whole member, both back and sides, may be more or less flared upwardly and outwardly so as to be a little wider at the top than at the bottom. The top edge is rolled to form a stiff tubular finish 4 to the top of the member, and this tubular edge may have a stiff rod therein if desired to further stiffen the same. Said tubular edge 4 is substantially semicircular in form, and lies in the same horizontal plane as the confining rail 8, the ends of edge 4 being directly opposite the rear ends of rail section 8, where the ends of said section 8 are bent in elbow form to turn downwardly into the integral brace rail sections 9, that moreover lie directly in front of and protect the front contiguous edges of the sides of the seat supported member 3.

Further, although the confining rail 8 is supported by the brace parts 9 that are fastened on the seat board and is not carried at all by the back and side member 3, yet to prevent dislocation of the rail 8 when handled roughly and pressed against by an agile child I find it convenient to secure knobs or caps 5 on the ends of the tubular stiff edge 4, said caps 5 having therein indentations or recesses 11 that receive and engage the knuckles or covered elbows at the rear bends on rail 8 where it turns into braces 9, but these indented knobs may be omitted without injury, as they do not support the guard rail, but merely keep the parts in better alignment to give a more finished appearance.

Heretofore it has been common to support a guard rail on the top of the seat back and side forming member and have it project from it. Such a support lacks strength and endurance. When the guard is supported directly on the seat board as I have placed it it will be found very strong, durable and effective; and if it is bent into the form I have indicated so as to present a horizontal semicircular portion directly in front of the back and side enclosing member, it will serve most usefully in exactly the right location for the child to grasp and handle for the usual purposes. As stated the front end of guard 8 may be upheld by the auxiliary brace 12, but this may be omitted when desired. The rail 8 may be enclosed in a rubber tube 8ª. The side member 3 may have openings 20 for any desired purpose, as the connection of a strap or cord.

Moreover, obviously, there may be many changes made in the exact construction and combination, especially as to details and arrangement, without exceeding the scope of the invention as construed in the ensuing claims.

What I claim, is:

1. In a child's vehicle, the combination with a main seat board and wheel provided means thereunder at front and back, said seat board having a broad seat proper at the rear and a narrower portion in front thereof adapted to be straddled by the child when he is propelling the vehicle with his feet, of an upright back member on the seat having forwardly extending sides formed with angular recesses, and a confining rod located in front of the back member, and having a horizontal curved part above the narrower part of the seat board, and integral substantially vertical members whose lower ends are secured to the seat board, said confining rod engaging the said angular recesses to assist in maintaining its position.

2. In a child's vehicle, the combination with a main seat board having a rear seat portion proper, of an upright back-and-side forming member on the seat having at its forwardly projecting ends indented means, and a confining rod in front of said back and having a horizontal semicircular part and integral downwardly-extending support rails, secured to the seat board, the elbow bends in the confining rod being adapted to snap into the indented means to hold the confining rod in a rigid position.

3. In a child's vehicle, the combination with a main seat board having a rear seat portion and a narrower front portion, of an upright back and side forming member secured to the seat, and with its forward edges provided with recessed caps, a horizontal semicircular confining rod in front of said back-and-side member and above the narrower section of the seat, and means for supporting said confining rod entirely independently of the back-and-side member, said confining rod loosely engaging the recessed caps with a spring effect to prevent lateral displacement of the confining rod from its normal position when in use.

In testimony whereof I hereunto affix my signature.

CLARENCE WATSON WHITE.